(12) United States Patent
Teibel

(10) Patent No.: US 6,366,962 B1
(45) Date of Patent: Apr. 2, 2002

(54) METHOD AND APPARATUS FOR A BUDDY LIST

(75) Inventor: Dan A. Teibel, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/216,319

(22) Filed: Dec. 18, 1998

(51) Int. Cl.[7] ............................................... G06F 15/16
(52) U.S. Cl. ...................................... 709/245; 709/203
(58) Field of Search ................................ 709/245, 203, 709/217, 219, 220

(56) References Cited

U.S. PATENT DOCUMENTS 6,131,121 A * 10/2000 Mattaway et al. .......... 709/227
6,215,784 B1 * 4/2001 Petras et al. ................ 709/217

OTHER PUBLICATIONS

What MyIP.Zip Archive File Ftp: 11ftp.cat–soft.com/add–ons/what myip. Mar. 17, 1997.*

* cited by examiner

Primary Examiner—Mehmet B. Geckil
(74) Attorney, Agent, or Firm—Steven D. Yates

(57) ABSTRACT

A method comprises locating a second client communication address stored on a second server using a second server identification; reading the second client communication address from the second server using the second server identification to locate the second server; and verifying the second client by requesting the second client to store a known value on a personal data area of the second server which is then read back.

16 Claims, 8 Drawing Sheets

METHOD AND APPARATUS FOR A BUDDY LIST

BACKGROUND

1. Field

The present invention relates to electronic information exchange and, more particularly, to electronic information exchange using a buddy list.

2. Background Information

Buddy lists provide a mechanism by which people (called users or participants in the buddy list) may locate one another on a network. A buddy list allows users to identify other users who are currently on-line, and to retrieve connection addresses by which communication with those users may be accomplished. Collectively, a group of users who participate in a buddy list may be called the buddy group.

On the Internet, the connection address of a user is typically the user's Internet Protocol (IP) address. The IP address, typically a digital sequence of numbers, is assigned dynamically each time a user goes online (i.e., each time the user creates a logical connection to the network). Buddy lists provide a way to associate a user-friendly name with a dynamically-assigned IP address.

Current buddy list implementations may provide a central "identity" server to map user-friendly names with IP addresses. A user wishing to find others on the network may access the identity server and search for the others using their user-friendly names. A valid IP address associated with a name may indicate that the searched-for user is online. As more users access an identity server, the matching of names with IP addresses may-slow under the increased load. When an identity server fails, no name-to-IP matching may occur on that server. The identity server is typically coupled with a dedicated Internet connection, which may be expensive to maintain.

Current buddy list implementations may be vulnerable to infiltration by parties which are not intended participants in the buddy group. Infiltration may be accomplished using "IP spoofing", in which a party assumes the IP address of an intended participant. Such implementations may not provide verification that a message signal originates from an intended participant in the buddy group.

SUMMARY

A method of implementing a buddy list includes locating a second client communication address stored on a second server using a second server identification. The second client communication address is read from the second server using the second server identification to locate the second server. The second client is verified by requesting the second client to store a known value on a personal data area of the second server which is then read back.

BRIEF DESCRIPTION OF THE DRAWINGS

The subject matter regarded as the invention is particularly pointed out and distinctly claimed in the concluding portion of the specification. The invention, however, both as to organization method of operation, may be further understood by reference to the following detailed description when read with the accompanying drawings.

DETAILED DESCRIPTION

The embodiments described herein enable an advantageous buddy list. For example, some embodiments of a buddy list may be implemented without an identity server or the installation of a dedicated Internet connection by one or more buddy list users. The embodiments described herein are merely illustrative, and one skilled in the art will appreciate that numerous modifications can be made which nonetheless fall within the scope of the present invention.

One embodiment may be implemented where the buddy list participants have access to an Internet Service Provider (ISP), home page service, or other web servers capable of hosting the participant's home pages or other personal data. For example, many ISPs provide a service by which users have access to an area of the ISP's servers on which the user can store personal information, such as a home page. In one embodiment, each participant in the buddy group may store, on their associated home page area or other personal data area, a connection address dynamically assigned each time the participant goes online. Each participant in the buddy group may then locate the connection address of the others by accessing personal data areas of the others. The personal data area of a particular participant may typically only be written with information from that particular participant; other participants in the buddy group (or other parties who are online and not members of the buddy group) will typically not have 'write' privileges to a participant's personal data area. However, each participant typically will have 'read' privileges to the information stored in the personal data areas of the other participants.

Figure 1:
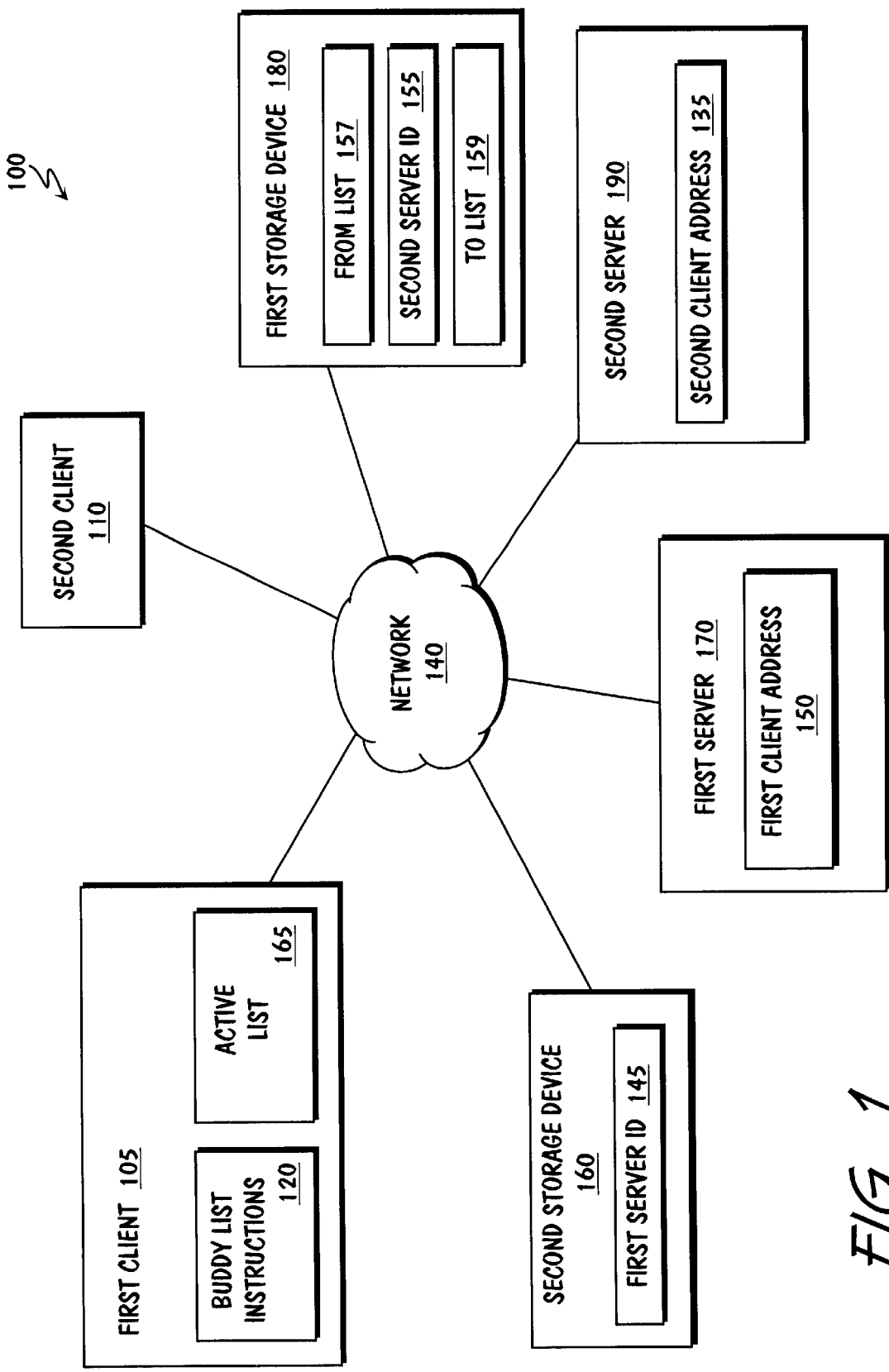
FIG. 1 is a schematic diagram illustrating an embodiment of a buddy list in accordance with the present invention.

Referring now to FIG. 1, a schematic diagram illustrating an embodiment 100 of a buddy list is shown. Clients 105 and 110 are coupled by way of a network 140 to servers 170 and 190. In one embodiment, clients establish a dial-up connection with an ISP to create a logical connection to the network 140 (i.e. to go online), although techniques other than dial-up for opening a logical connection are possible within the scope of the invention. For example, clients coupled to a corporate intranet may create a logical connection to the network by executing a web browser application.

In embodiment 100, the clients 105 and 110 typically represent any data processing device comprising a processor capable of executing instructions, a bus coupled to the processor to supply the instructions to the processor, and a storage medium to store the instructions to be executed by the processor. For example, a personal computer, handheld computer, or information appliance (such as a set-top Internet device) may be employed. In one embodiment, the clients 105 and 110 comprise personal computers (PCs) including an Intel Corporation Pentium® or compatible processor, although the invention is not limited in scope in this respect.

In embodiment 100, the client 105 is shown comprising buddy list instructions 120. The buddy list instructions 120 include sequences of instructions stored on the client 105 to implement an embodiment of a buddy list as described below.

The servers 170 and 190 are data processing devices comprising special hardware and software which enables programs and data stored on the servers to be accessed over the network 140 by clients 105 and 110. For example, the servers may comprise computers running a variant of the Unix™ operating system, or the Windows® NT® Server operating system from Microsoft Corporation. The technical differences that distinguish client and server devices are well-known in the art and to elaborate in detail would only obscure the description of the present invention.

When each participant already has the privilege of having a home page or other personal data area on the ISP server or through some other arrangement or situation, an economical embodiment of a buddy list may be possible by using those web servers to store connection addresses. In one embodiment, the servers 170 and 190 may be provided by a home page service such as GeoCities, Inc. The servers could also be provided by a combination of ISPs, home page services, and other arrangements or situations.

As illustrated in FIG. 1, a server id 155 is stored on the storage device 180. In like manner, a server id 145 is stored on storage device 160. The server ids 145 and 155 may comprise any stored signal which enables clients 105 and 110 to uniquely identify servers 170 and 190, respectively, on the network 140. In one embodiment, the server ids comprise Internet Uniform Resource Locators (URLs). The manner is which URLs identify servers on a network is well known in the art and, in the interest of not obscuring the present invention, is not recited here. Again, this is only one embodiment, and the invention is not limited in scope to the use of URLs.

In one embodiment, the storage devices 180 and 160 comprise network storage devices. For examples, the storage devices may comprise the hard drives on any servers which may be accessed by the clients. Potential storage devices include a hard disk, a CD ROM, and a Read-Only Memory. Although not illustrated in embodiment 100, storage device 180 may also comprise a hard disk, CD ROM, ROM, or other storage medium which is local (not accessed through the network) to client 105. A local hard drive within client 105 is a common example of such a local storage medium. Likewise, storage device 160 may comprise a hard disk, CD ROM, ROM, or other storage medium local to client 110.

In one embodiment, the client 105 stores a communication address on the server 170, the communication address comprising a digital sequence representing the IP address of the client 105. In like manner, the client 110 stores a communication address on server 190. In one embodiment this is accomplished using the Internet File Transfer Protocol (FTP). Other well known protocols for this purpose include the Hyper Text Transfer Protocol (HTTP) and various remote file system protocols. The invention is in no way limited to the use of a particular protocol for storing the communication address on the servers. Nor is the invention limited to IP addresses and may be implemented using other communication address types which are supported by the network 140.

In overview, in one embodiment the buddy list instructions 120, when executed by client 105, result in the client 105: storing a communication address 150 on the server 170, the communication address 150 identifying the client on the network 140; locating the communication address 135 of another client of another participant in the buddy group, the communication address 135 stored on server 190; reading the address 135 from the server 190; verifying the other participant; and communicating with the client 110 using the address 135. With this overview as a starting point, details are now presented to better explain the operation of one embodiment of the invention.

In one embodiment, reading the communication address 135 is accomplished using FTP. Other embodiments may, for example, use HTTP or various remote file system protocols. The invention is in no way limited to the use of a particular protocol for reading the communication address.

Upon reading communication address 135, the client 105 may use the communication address 135 to maintain an ACTIVE list 165. The ACTIVE list 165 identifies members of the buddy group to which the user of the client 105 belongs whom are currently online. The ACTIVE list 165 is used in accordance with a TO list 159 stored on the storage device 180, as explained more fully under the description of FIG. 8. The TO list 159 comprises a list of users in the buddy group to which the user of client 105 wishes to send awareness signals. The FROM list 157 stored on the storage device 180 comprises a list of users in the buddy group from whom the user of the client 105 wishes to receive awareness signals, and is used in accordance with the ACTIVE list 165 as explained more fully in the description of FIG. 5. The purpose and function of the FROM list 157, the TO list 159, the ACTIVE list 165, and awareness signals are explained more fully in the descriptions of FIGS. 5, 6, 7, and 8.

Buddy groups with limited resources, such as small and nonprofit groups, may employ an embodiment of a buddy list without purchasing expensive central server hardware or a dedicated Internet connection. Instead, web servers provided by the participant's ISP, web page hosting service, or online community, among numerous possible arrangements, may be used. If the web server where a participant stores their communication address fails, that participant cannot be located by other members of the buddy group, but otherwise the buddy list operates appropriately. Also, the risk of a computing bottleneck may be reduced because each client's associated web server may contribute to the computing resources available to the buddy group. In one embodiment participants in the buddy group store, within their FROM and TO lists, the web server URLs of other participants so that they may locate the others online.

Figure 2:
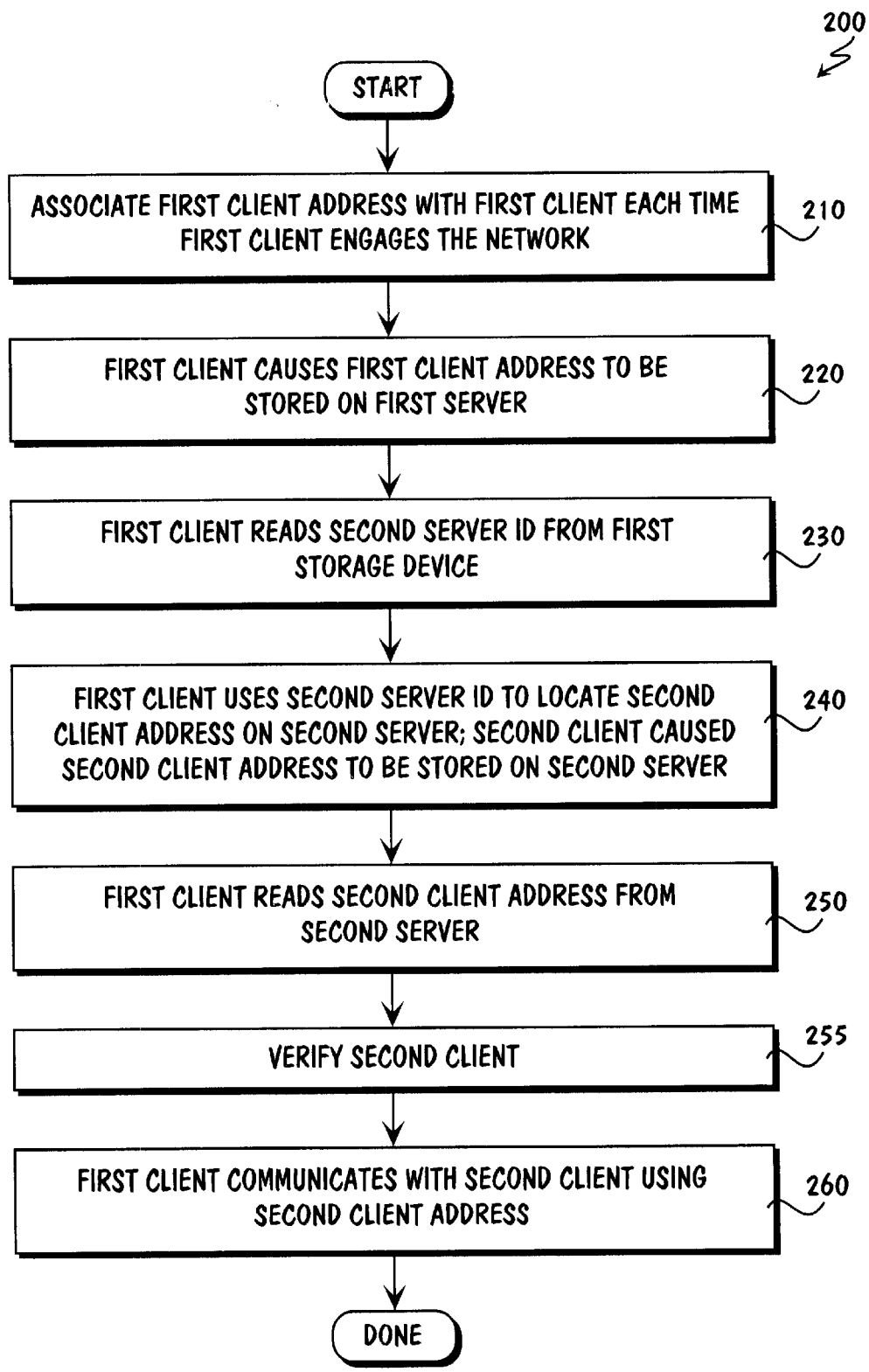
FIG. 2 is a flowchart illustrating one embodiment of a method to implement a buddy list in accordance with the present invention.

Referring now to FIG. 2, a schematic diagram illustrating one embodiment of a method 200 to implement a buddy list is shown. At 210, a first communication address is associated with the first client each time the client goes online. The first client stores the first client communication address on a first server at 220. At 230, the first client reads a second server id from a first storage device. The second server id identifies a second server on the network and in one embodiment comprises a URL stored on a local hard disk of the first client, although the invention is not limited in this regard. The first client uses the second server id to locate a second client communication address on the second server at 240.

At 250, the first client reads the second client communication address from the second server. To prevent forms of spoofing, in which a party attempts to assume the identify of a buddy group participant, the second client may be verified 255 by requesting, for example, that the second client store information on the personal data area of the second server. If the first client can read this data back, it may indicate that the user of the second client has write privileges to the personal data area of the second server. Write privileges to this personal data area may indicate that the user of the second client is a buddy participant associated with the second server.

At 260, the first client communicates with the second client using the second client communication address. Communication can include, but is not limited to, exchanging signals comprising text, images, and multimedia between the first and second clients. In one embodiment the clients comprise PCs, the server ids comprise URLs, the communication addresses comprise IP addresses, and the servers are web servers comprising the home page or other personal data areas of the users of the clients.

One skilled in the art will appreciate that the method of FIG. 2 need not occur in the precise order of illustration to remain in the spirit of the present invention. For example, the second server id may be read from the first storage device by the first client at any time prior to the first client locating the second client communication address on the second server.

Figure 3:
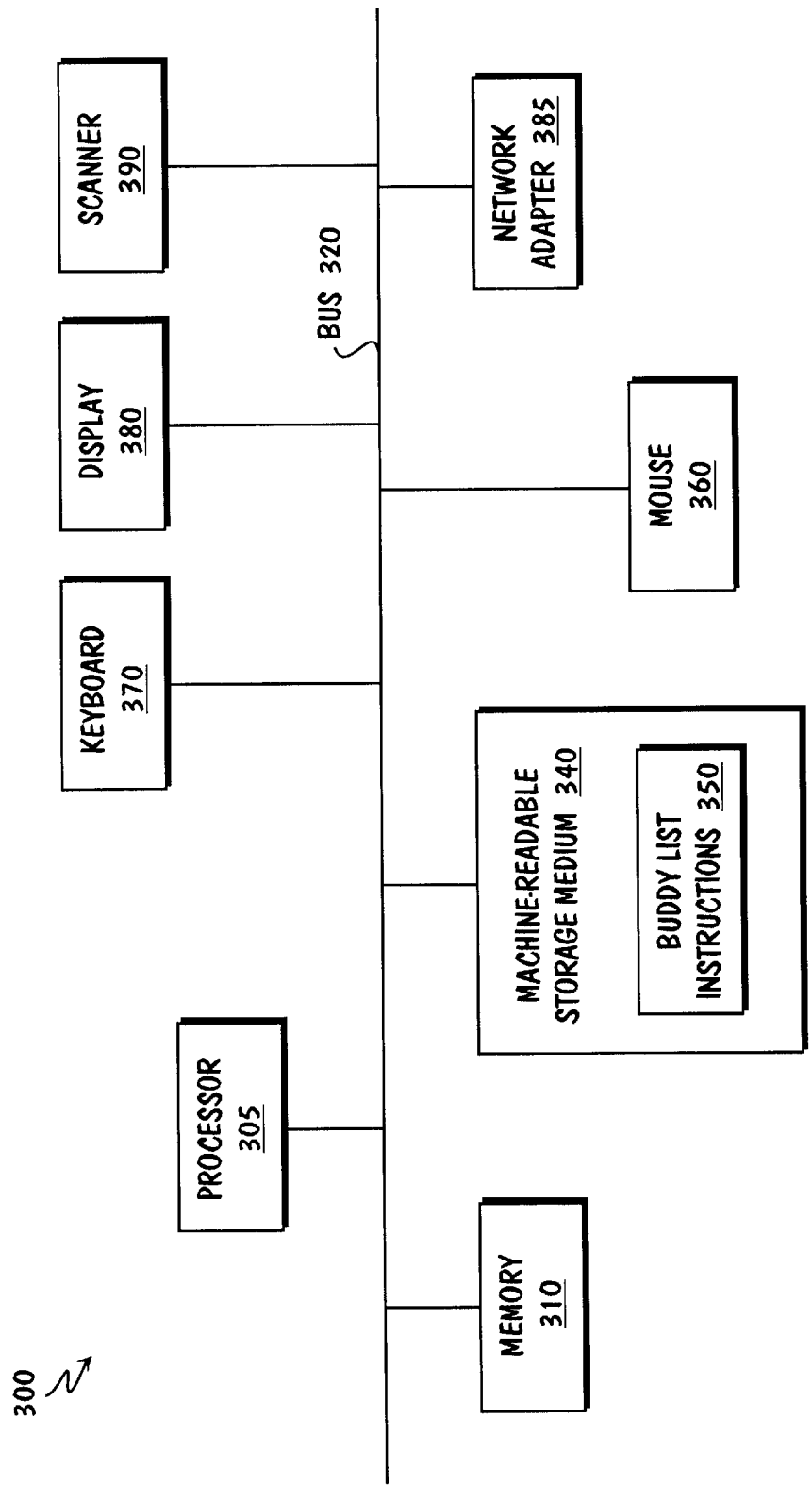
FIG. 3 is a schematic diagram illustrating an embodiment of a data processing device to implement an embodiment of a buddy list in accordance with the present invention.

Referring now to FIG. 3, an embodiment of a data processing device 300 to implement an embodiment of a buddy list in accordance with the present invention is illustrated. Embodiment 300 comprises a processor 305 to execute instructions supplied from a bus 320. The executed instructions are stored in a memory 310 from which they are supplied to the processor 305 by the bus 320 for execution. The processor 305 may execute any instruction set including, but not limited to, instruction sets supported by an Intel Corporation Pentium® processor or compatible processor. The bus 320 may be implemented using technologies for propagating signals including, but not limited to, electronic and optical conductors. The memory may include random access memory (RAM), read-only memory (ROM), or any other form of memory capable of storing instructions which may then be supplied to the processor 305 by the bus 320 for execution. Embodiment 300 may include a machine-readable storage medium 340 to store sequences of instructions which may be loaded into volatile memory 310 from which they may be supplied to processor 305 for execution. The machine-readable storage medium 340 may include, but is not limited to, a hard drive, a floppy drive, and a CD-ROM or other optical disk.

One skilled in the art will appreciate that in "diskless" devices without mass storage mediums, the machine-readable storage medium 340 may be omitted from the embodiment 300. Instructions, including buddy list instructions 350, may then be stored in RAM, ROM, or other memory from which instructions may be directly accessed over the bus 320 by the processor 305 for execution.

To perform signal input/output, embodiment 300 comprises a mouse 360, a keyboard 370, a camera 380, and a scanner 390, each coupled to the bus 320 for transmitting data so that it may be easily accessed or manipulated by a user. The embodiment 300 further includes a network adapter 385 to couple the embodiment 300 to a network. Those skilled in the art will appreciate that for devices which perform dial-up access to the network, a modem may be disposed in place of or in addition to the network adapter 385.

In accordance with the present invention, embodiment 300 is shown storing buddy list instructions 350 on the machine-readable storage medium 340. The buddy list instructions include sequences of instructions for performing a method embodiment such as the one illustrated in FIG. 2. These instruction sequences are further illustrated in FIG. 4.

Figure 4:
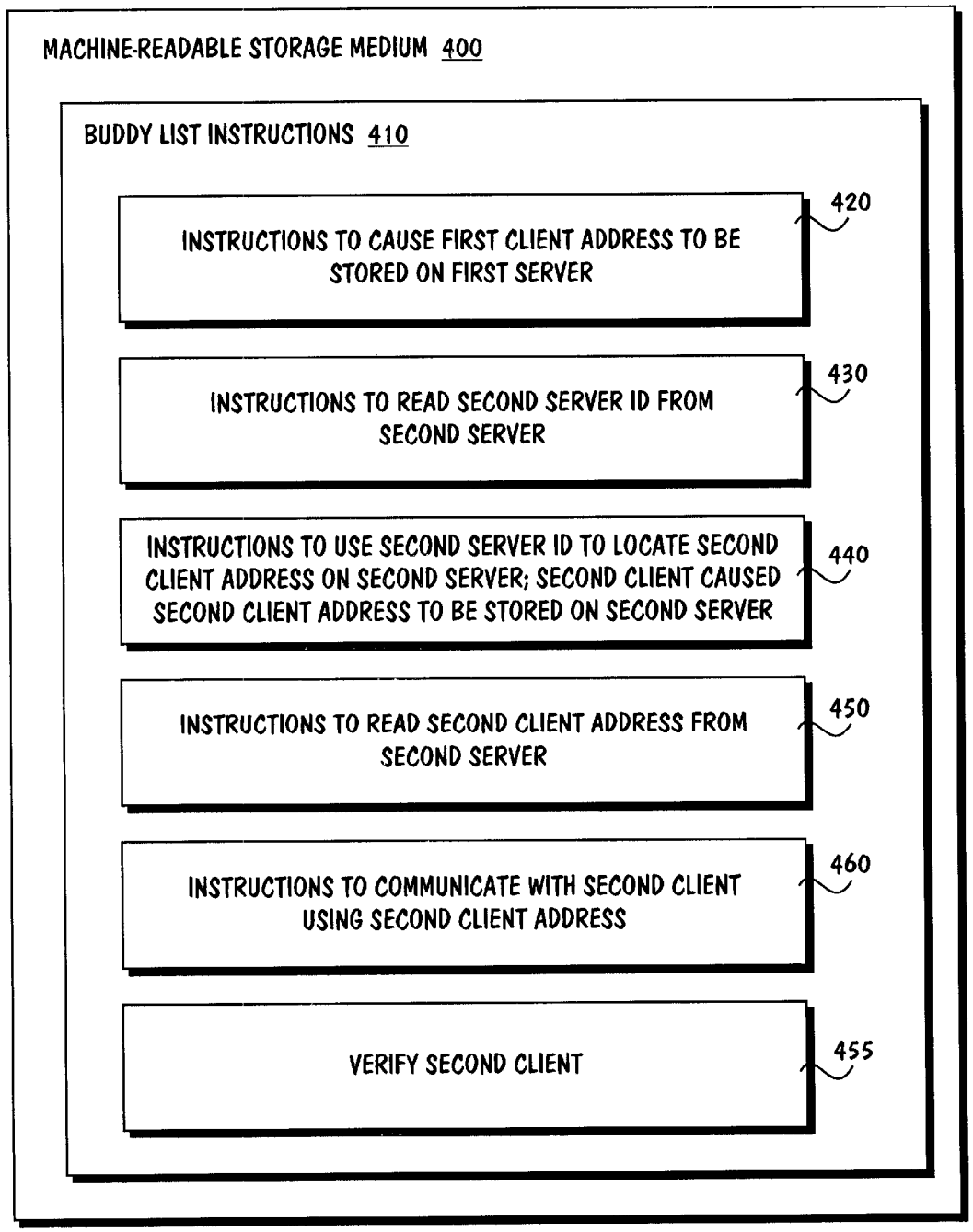
FIG. 4 is a schematic diagram illustrating an embodiment of a machine-readable storage medium comprising a sequence of instructions to implement an embodiment of a buddy list in accordance with the present invention.

Referring now to FIG. 4, a schematic diagram illustrating an embodiment of a machine-readable storage medium 400 comprising a sequence of instructions 410 to implement an embodiment of a buddy list in accordance with the present invention is shown. The machine-readable storage medium 400 may comprise RAM, ROM, a floppy disk, and hard disk, a CD ROM, or any other memory capable of storing sequences of instructions which may be executed by a data processing device such as, for example the device embodiment illustrated in FIG. 3.

In this particular embodiment, the buddy list instructions comprise sequences of instructions to carry out a method embodiment such as the one illustrated in FIG. 2, including but not limited to: instructions 420 to store a first client communication address on a first server; instructions 430 to read a second server id from a first storage device; instructions 440 to use the second server id to locate a second client communication address on a second server; instructions 450 to read the second client communication address from the second server; instructions 455 to verify the second client; and instructions 460 to communicate with the second client using the second client communication address. Of course, the invention is not limited in scope to this particular embodiment.

The manners of producing the machine-readable storage medium 400 storing sequences of instructions, such as buddy list instructions 410, are well known in the art and to elaborate in detail would merely obscure the description of the present invention.

Figure 5:
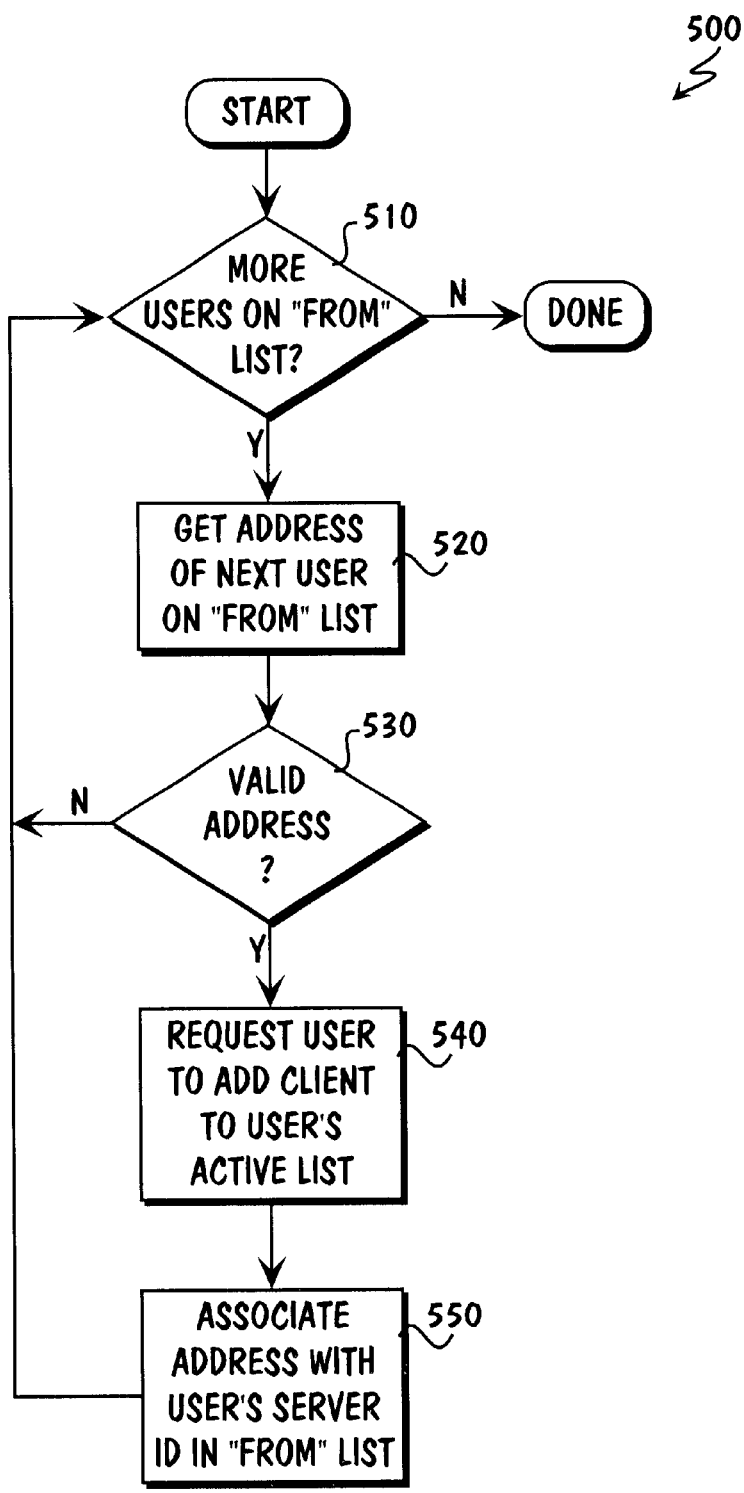
FIG. 5 is a flowchart illustrating one embodiment of a method to cause a user to be added to a buddy ACTIVE list in accordance with the present invention.

Referring now to FIG. 5, a flowchart illustrating one embodiment of a method to cause a user to be added to a buddy ACTIVE list in accordance with the present invention is shown. As previously noted in regard to FIG. 1, a TO list and a FROM list are stored on a client of a user in a buddy group. Each list comprises the ids of servers associated with the users in the group. The client also stores an ACTIVE list which comprises identifications of members of the buddy group whom are currently online. The TO list comprises a list of users in the buddy group to which the user may send awareness signals. The FROM list comprises a list of users in the buddy group from whom the user may receive awareness signals. Awareness signals comprise state information about a user; for example, whether the user is available for on-line chat, or whether the user is in a mode of do-not-disturb, or whether the user is away from their associated client, or available to play on-line games. Awareness signals are received by a user's client when other users in the user's buddy group change state. These are only some examples of awareness signals, and the invention may comprise many others as well.

At 510, the client reads the FROM list to determine if there are more users identified in the list. If a next user is identified, at 520 the communication address of the next user is read from the user's associated server, which is identified in the FROM list. The communication address is validated at 530. In one embodiment, the communication address is validated by requesting that the client of the user store a known value on the user's associated server. This known value is then read back. If the user is able to store the known value on the server, there is a high probability that the user is the identified member from the FROM list, because only this member would likely have write access to the associated server. If the user is unable to store the known value on the server, there is a high probability that the user is "spoofing" the identified member from the FROM list (because an imposter would not have write permission on the associated server), and awareness information may not be accepted from the user. If the communication address is valid, at 540 the client of the identified user is signaled to add the client to the user's ACTIVE list, and then associates the communication address with the user's server id in the FROM list at 550. The method is repeated for each user identified in the FROM list.

Figure 6:
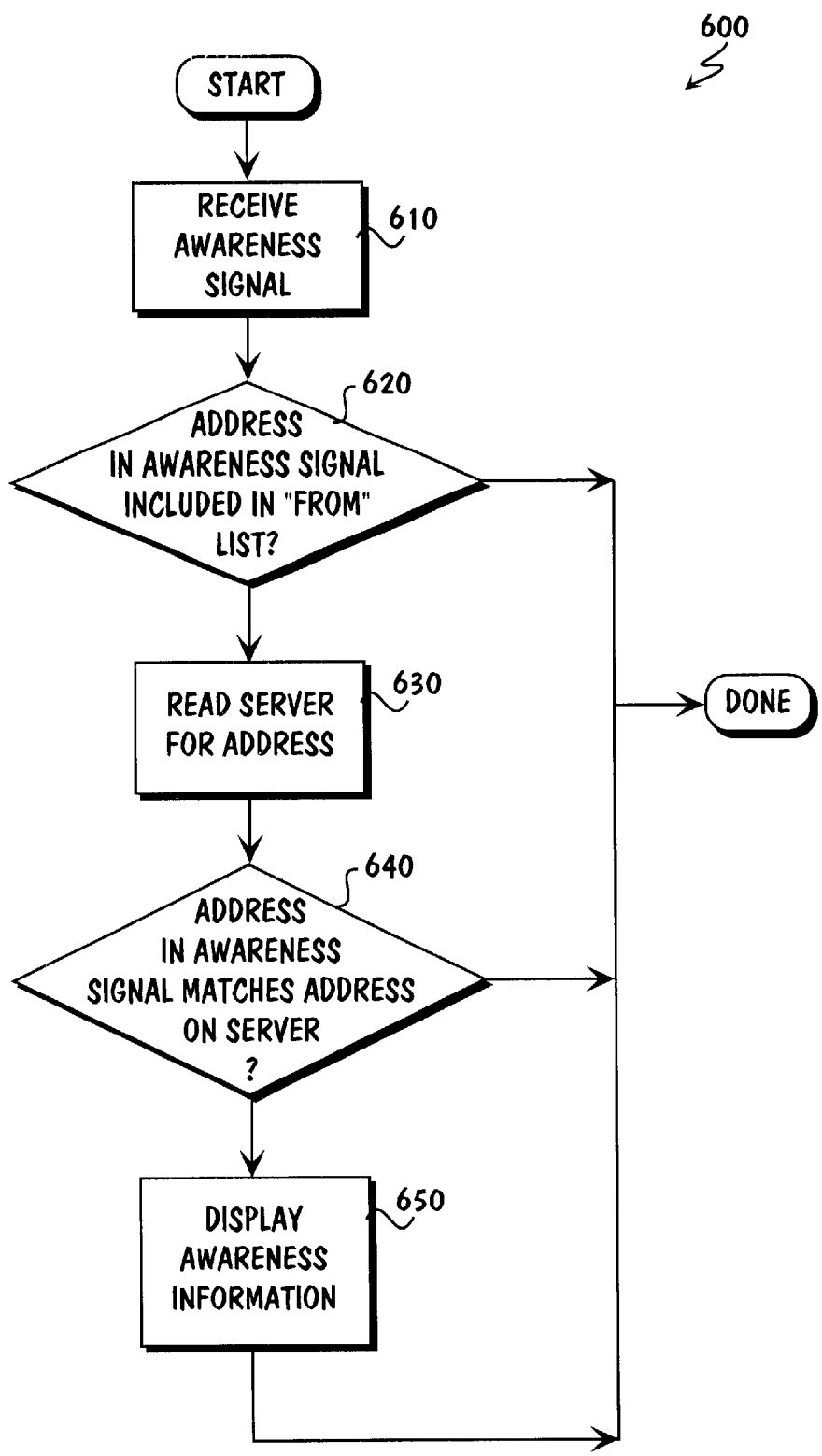
FIG. 6 is a flowchart illustrating one embodiment of a method to respond to an awareness signal in accordance with the present invention.

Referring now to FIG. 6, a flowchart illustrating one embodiment of a method to respond to an awareness signal in accordance with the present invention is shown. At 610, an awareness signal is received. The awareness signal comprises an identification of the sending client's communication address on the network. The receiving client checks whether the awareness signal is from a communication address associated with a server id comprised by the user's FROM list. If not, the signal is ignored. If so, the server id associated with the communication address is read at 630 from the FROM list and the personal data area of the server is checked for validating information at 640. For example, in one embodiment the IP packet comprising the awareness information contains a header with the sender's IP address. The FROM list is searched for a corresponding IP address, and the associated server is checked for a known value that the sender should store there (for example, a sequence number). Of course, this example merely exemplifies an embodiment of the invention and other techniques may be employed. If the server contains the known value, the awareness information comprised by the awareness signal is displayed at 650. Again, the purpose of checking the personal data area (for example, home page area) of the server for the known value is to discourage IP spoofing.

Figure 7:
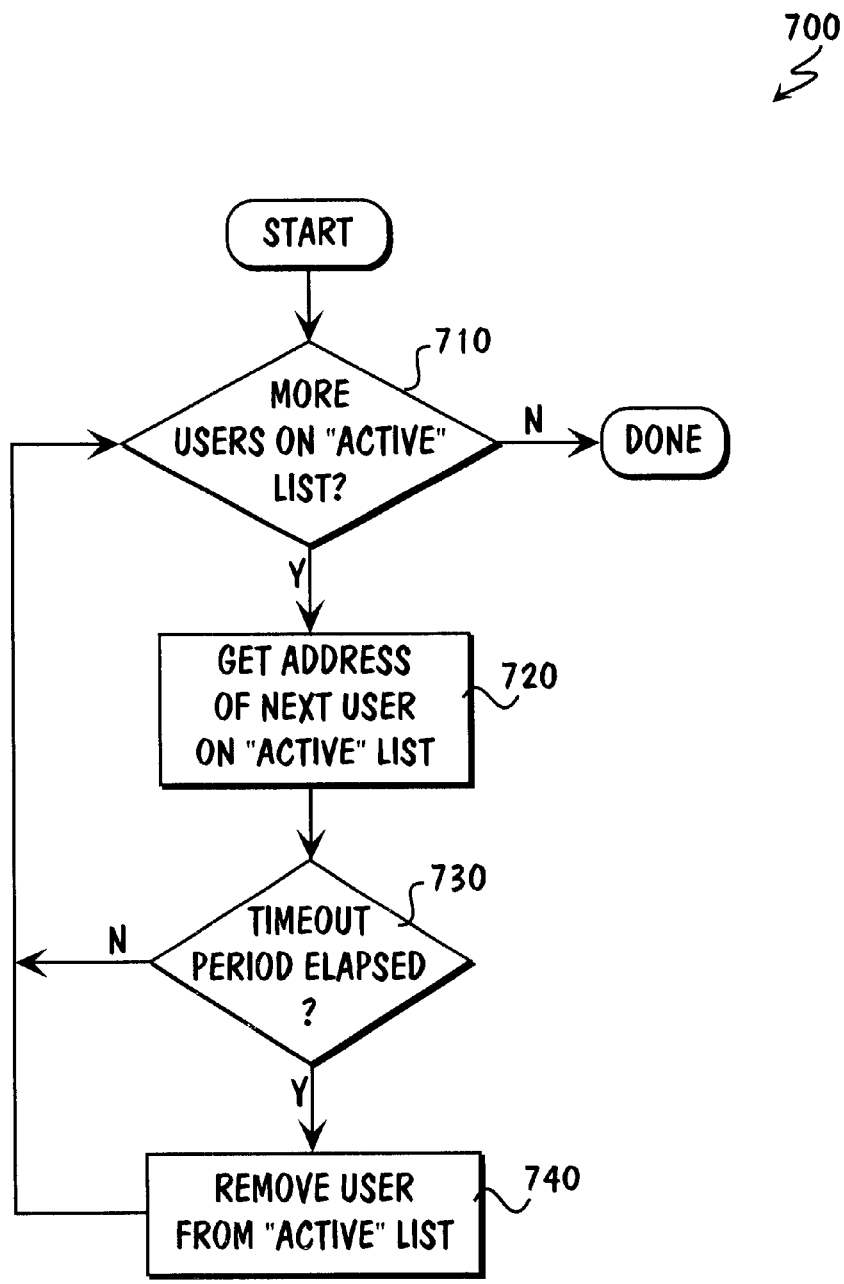
FIG. 7 is a flowchart illustrating one embodiment of a method to maintain a buddy ACTIVE list in accordance with the present invention.

Referring now to FIG. 7, a flowchart illustrating one embodiment of a method to maintain a buddy ACTIVE list in accordance with the present invention is shown. The ACTIVE list comprises a list of server ids and associated communication addresses for other users in the user's buddy group who are online. At 710, the client reads the ACTIVE list to determine if there are more users identified in the list. If a next user is identified, the communication address of the next user is read at 720. At 730, the elapsed time since the last receipt of signals from the user's associated client is checked against a timeout interval. If the timeout period has elapsed, at 740 the client removes the user from the ACTIVE list.

Figure 8:
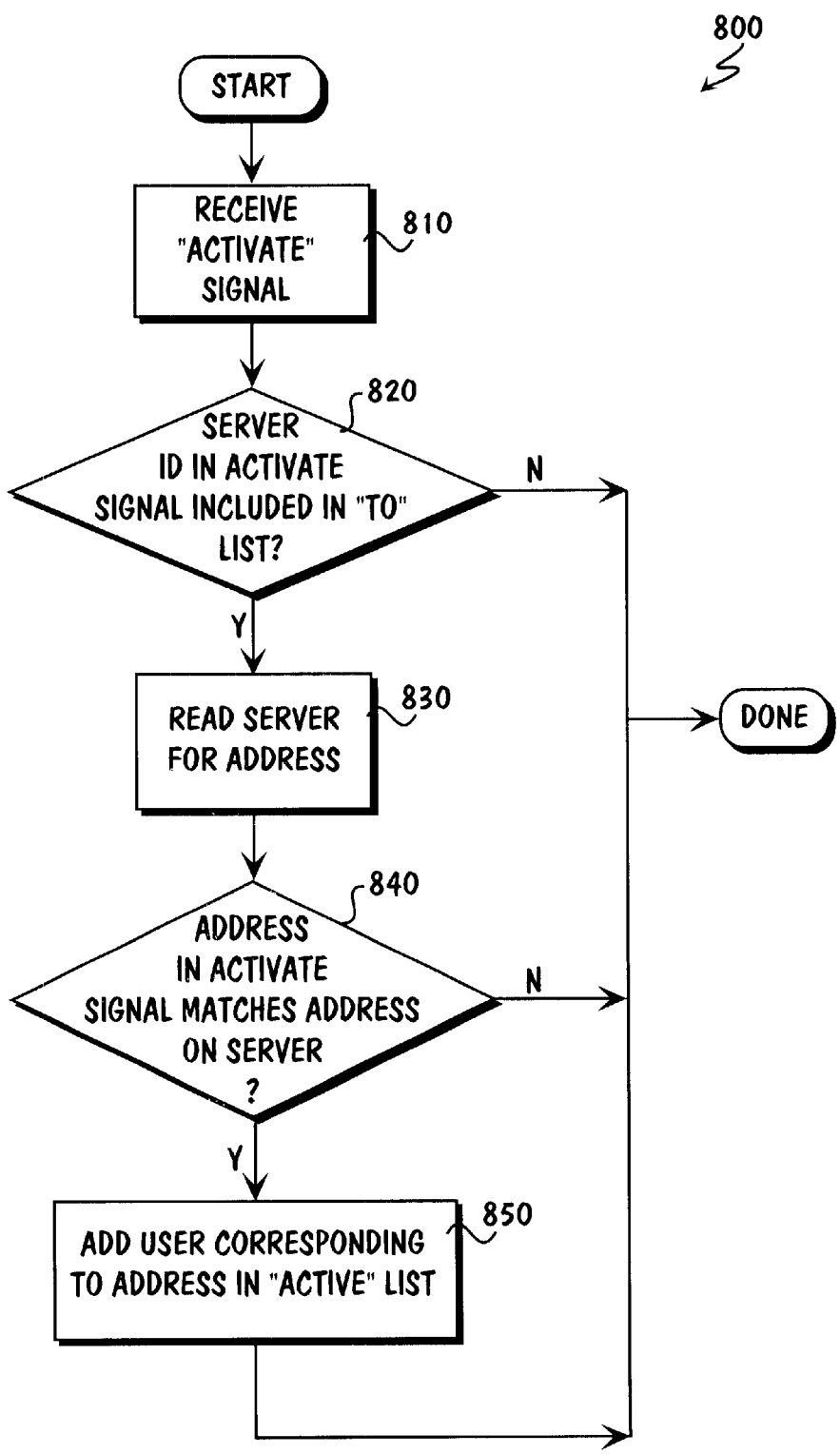
FIG. 8 is a flowchart illustrating one embodiment of a method to respond to an ACTIVATE signal in accordance with the present invention.

Referring now to FIG. 8, a flowchart illustrating one embodiment of a method to respond to an ACTIVATE signal in accordance with the present invention is shown. ACTIVATE signals are received by a user's client when other users in the user's buddy group are requesting to be added to the user's ACTIVE list. At 810, an ACTIVATE signal is received. The ACTIVATE signal may comprise an identification of the sending client's communication address on the network and of the sending client's server id. The receiving client at 820 checks that the server id comprised by the ACTIVATE signal is a server id comprised by the user's TO list. If not, the signal is ignored. If so, the communication address for the sending client is read at 830 from the identified server and checked against the address comprised by the ACTIVATE signal at 840. If the address on the server matches the address comprised by the ACTIVATE signal, the client corresponding to the communication address in the TO list is added to the user's ACTIVE list at 850. Of course, this is merely one embodiment, and any type of known information may be read from the server to verify the sending client.

In summary, embodiments of a buddy list have been disclosed with advantages over prior implementations. One embodiment utilizes the fact that buddy list users typically have access to an Internet Service Provider (ISP), home page service, or other web server capable of hosting the user's web pages. In this embodiment, clients of users in the buddy group may store on the user's associated home page a communication address associated with the user's client machine each time the user engages a network. Each client in the buddy group may then locate the communication addresses of clients of other users by reading the other client's addresses from the other user's home pages. User's may verify one another by having clients post known information on the user's home page area or personal data area which may then be read back by the other clients.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method comprising:

locating a first client communication address stored on a first server using a first server identification;

reading the first client communication address from the first server using the first server identification to locate the first server; and verifying the identity of a user of the first client by reading a first data signal having an expected value from a first personal data area of the first server, the personal data area of the first server comprising a network-accessible storage area for which the user of the first client has write privileges but for which a user of a second client does not have write privileges.

2. The method of claim 1 further comprising:

storing a second data signal having an expected value on a second personal data area of a second server, the first and second servers possibly the same, the second personal data area of the second server comprising a network-accessible storage area for which the user of the second client has write privileges but for which the user of the first client does not have write privileges.

3. The method of claim 1 in which locating the first client communication address using the first server identification further comprises:

locating the first client communication address on a web server using a Uniform Resource Locator.

4. The method of claim 1 in which locating the first client communication address further comprises:

locating an IP address for the first client.

5. The method of claim 1 in which verifying the identity of the user of the first client further comprises:

requesting the first client to store the first data signal on the first personal data area of the first server in response to becoming aware of the first client's presence on a network.

6. A device comprising:

a processor;

a machine-readable storage medium coupled to the processor by way of a bus, the storage medium storing a sequence of instructions which, when executed by the processor, cause the data processing device to locate a first client communication address stored on a first server using a first server identification;

read the first client communication address from the first server using the first server identification to locate the first server; and verify the identity of a user of the first client by reading a first data signal having an expected value from a first personal data area of the first server, the personal data area of the first server comprising a network-accessible storage area for which the user of the first client has write privileges but for which a user of a second client does not have write privileges.

7. The device of claim 6 in which the sequence of instructions, when executed by the processor, further cause the device to:

store a second data signal having an expected value on a second personal data area of a second server, the first and second servers possibly the same, the second personal data area of the second server comprising a network-accessible storage area for which the user of the second client has write privileges but for which the user of the first client does not have write privileges.

8. The device of claim 6 in which the first server is a web server.

9. The device of claim 6 in which the first server identification comprises a Uniform Resource Locator.

10. The device of claim 6 in which the first client communication address comprises an IP address.

11. The device of claim 6 in which the sequence of instructions, when executed by the processor, further cause the device to:

request the first client to store the first data signal on the first personal data area of the first server in response to becoming aware of the first client's presence on a network.

12. An article comprising:

a machine-readable medium having stored thereon a sequence of instructions which, when executed by a data processing device, cause the data processing device to:

locate a first client communication address stored on a first server using a first server identification;

read the first client communication address from the first server using the first server identification to locate the first server; and verify the identity of a user of the first client by reading a first data signal having an expected value from a first personal data area of the first server, the personal data area of the first server comprising a network-accessible storage area for which the user of the first client has write privileges but for which a user of a second client does not have write privileges.

13. The article of claim 12 in which the sequence of instructions, when executed by the data processing device, further cause the device to:

store a second data signal having an expected value on a second personal data area of a second server, the first and second servers possibly the same, the second personal data area of the second server comprising a network-accessible storage area for which the user of the second client has write privileges but for which the user of the first client does not have write privileges.

14. The article of claim 12 in which the sequence of instructions, when executed by the data processing device, further cause the device to:

locate the first client communication address on a web server using a Uniform Resource Locator.

15. The article of claim 12 in which the sequence of instructions, when executed by the data processing device, further cause the device to:

locate an IP address for the first client on the first server.

16. The article of claim 12 in which the sequence of instructions, when executed by the data processing device, further cause the device to:

request the first client to store the first data signal on the first personal data area of the first server in response to becoming aware of the first client's presence on a network.

* * * * *